3,570,250
JET ENGINE
Donald G. Pensel, Star Rte., Glens Falls, N.Y. 12801
Filed Aug. 12, 1969, Ser. No. 849,327
Int. Cl. F02k 3/00
U.S. Cl. 60—263     5 Claims

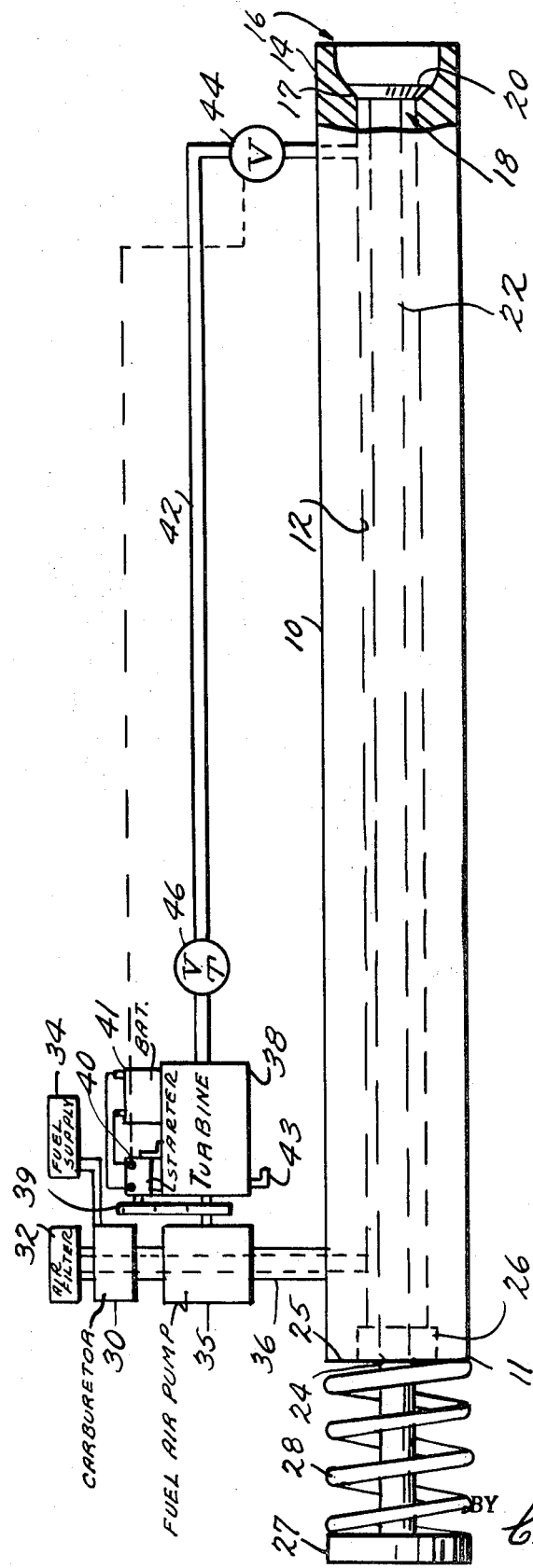

ABSTRACT OF THE DISCLOSURE

A jet engine is described having an elongated hollow cylindrical combustion chamber in which the combustion pressure is controlled by a valve operable to vary the opening of the exhaust outlet in response to the combustion level in the cylinder. The valve is spring operated with the spring constant being chosen so that a predetermined pressure in the combustion chamber will open the valve a predetermined amount. A carburetor means is provided for mixing fuel from a fuel source with air, and a fuel pump is provided for pumping this mixture into the combustion chamber by means of an intake manifold. The fuel-air pump is driven by a turbine which is operated by a portion of the exhaust gases generated in the combustion chamber. A throttle valve is interposed in the duct connecting the combustion chamber with the turbine so that the quantity of flow of the exhaust gases to the turbine may be controlled thereby controlling the rate at which fuel is pumped into the combustion chamber which in turn will determine the thrust developed by the engine.

---

This invention relates to jet engines developing diesel-type combustion which may be used in watercraft or aircraft.

An object of this invention is to provide a jet engine capable of operating at a constant combustion chamber pressure. Presently available jet engines have exhaust openings which are of a fixed geometry thereby causing the internal pressure to vary according to a throttle setting. There is a most efficient pressure for the operation of each jet engine at a given throttle setting, and the engine constructed according to the principles of this invention achieves a constant pressure at the most efficient level in order to insure that the engine operates at maximum efficiency regardless of throttle setting. The pressure is held at the most efficient level by a spring valve which normally closes the exhaust opening. When combustion in the combustion chamber generates sufficient pressure, the valve will be opened allowing exhaust gases to escape, but the spring constant of the spring operating the valve is chosen to be such that the valve will operate to maintain the pressure within the combustion chamber at a predetermined level. Sufficient back pressure is created to insure the most efficient combustion at all power levels.

Another object of this invention is to provide a simple, efficient and economical means for adequately pumping a fuel-air mixture into a combustion chamber in which high pressures are present. In the preferred embodiment constructed according to the principles of this invention this object is achieved by using a portion of the exhaust gases generated in the combustion chamber to drive a turbine or displacement motor which in turn will operate a fuel pump. A throttle valve may be interposed in the duct connecting the combustion chamber with the turbine in order to control the quantity of flow of exhaust gases to the turbine. In so doing, this valve will control the amount of thrust developed by the engine.

The above and other objects may be obtained in a jet engine constructed according to the principles of this invention, a description of a preferred embodiment of which is given hereinbelow. The invention may be best understood by reference to the aforementioned description in conjunction with the drawing which is a plan view of a preferred embodiment of a jet engine constructed according to the principles of this invention.

In the preferred embodiment a hollow cylinder 10 forms a combustion chamber 12 within the interior surface thereof. At an end 14 of cylinder 10, an exhaust outlet 16 is formed. Exhaust outlet 16 is of a concave, dish shape with the central portion 17 thereof communicating with combustion chamber 12.

A valve, indicated generally as 18, comprised of a valve stem 22 and a valve head 20 operates to normally close exhaust outlet 16. Valve head 20 is of a shape which substantially conforms to the shape of exhaust outlet 16 at a section 17 of the exhaust outlet so that the valve head sealably closes the outlet. Thus, when the valve 18 is extended axially rearwardly of cylinder 10 opening exhaust outlet 16, because of the concave shape of the outlet, an annular opening will be formed between the inner walls of the exhaust outlet 16 and valve head 20.

Valve stem 22 extends through an opening 24 in an end 11 of cylinder 10 opposite exhaust outlet 16. The area of opening 24 between valve stem 22 and an end wall 25 of cylinder 10 is closed by a seal 26. The seal 26 may be of any of a number of materials which are now commonly available which will allow valve stem 22 to slide freely therethrough and which will not deteriorate under the extreme temperatures experienced in combustion chamber 12.

A compression coil spring 28 is attached at one end to end wall 25 of cylinder 10 and at another end to a perpendicular member 27 which is integral with valve stem 22. Compression spring 28, in the absence of combustion in chamber 12, biases valve 18 to a position closing exhaust outlet 16. Coil spring 28 is selected to have a spring constant such that a predetermined combustion pressure in combustion chamber 12 will cause valve 18, acting against spring 28, to extend axially rearwardly of cylinder 10 opening the exhaust outlet 16 a predetermined amount of producing an annular opening of a predetermined area.

A carburetor means 30 is provided which is adapted to receive fuel from a fuel source 34 and air from an air intake and filter means 32, and the carburetor mixes the fuel and the air to provide a suitable fuel-air mixture for combustion in combustion chamber 12. This fuel-air mixture from carburetor 30 is communicated to a fuel-air pump 35 which pumps the mixture through an intake manifold 36 into the combustion chamber 12. As is discussed hereinbelow, the pump 35 must generate sufficient pressure to permit the fuel-air mixture to flow into the combustion chamber which will be at a relatively high pressure after combustion therein has commenced.

The fuel-air pump 35 is driven by a turbine 38, or a displacement motor may be used as well. Prior to the commencement of combustion in combustion chamber 12, turbine 38 is started and the turbine rotor is initially driven by a conventional electric starter motor 40 operably connected to turbine 38 by means of a drive means 39. This drive means 39 may be a conventional gearing arrangement or a conventional belt and pulley drive arrangement. A battery 41 charged by conventional means (not shown) is used to provide driving power for starter 40.

After fuel-air pump 35 has built up sufficient pressure in combustion chamber 12 and diesel-type combustion has taken place, the exhaust gasses thereby generated will be conducted from the combustion chamber 12 to turbine 38 by means of a duct 42. These exhaust gasses will be of a pressure and quantity sufficient to drive turbine 38. An exhaust duct 43 is provided on turbine 38 to remove the used gasses therefrom. An automatic valve 44, operatively connected to starter 40, is interposed in duct 42 so that when starter 40 is operating valve 44 will be closed thereby closing duct 42. When sufficient pressure has built up in combustion chamber 12, automatic valve 44 will be opened allowing the gasses to pass through duct 42 to operate to the turbine 38. A second valve, throttle valve 46 is interposed in duct 42 to control the flow of exhaust gasses to turbine 38. In so doing throttle valve 46 actually controls the amount of thrust developed by the jet engine in the manner to be described below.

In operation valve 18 initially closes exhaust outlet 16 prior to the commencement of combustion in combustion chamber 12. To commence operation of the engine, starter 40 is actuated driving the rotor of turbine 38 and thereby operating fuel-air pump 35. The pump is operated by this means until sufficient pressure is built up in combustion chamber 12 to permit diesel-type combustion to take place. At this point, automatic valve 44 is opened allowing exhaust gasses from the previously mentioned combustion to be conducted through duct 42 to turbine 48 thus permitting the exhaust gasses to take over as the driving means for the turbine. The operation of starter 40 then, of course, ceases. The setting of throttle valve 46 will control the quantity of flow of exhaust gasses to turbine 38 and this will in turn determine the quantity of fuel-air mixture pumped into combustion chamber 12. The quantity of flow through manifold 36 will determine the combustion level existing in combustion chamber 12 and thereby determine the thrust developed by the engine in the well-known manner.

The pressure of combustion in chamber 12 will act on valve 18 causing it to move axially rearwardly of the cylinder 10 opening exhaust outlet 16. Valve 18 will be acting against the force of spring 28 so that the area of the opening in the exhaust outlet will be determined by the combustion level developed in chamber 12. Thus, for a given throttle setting a constant pressure will be maintained in combustion chamber 12 by means of valve 18 and spring 28. If the setting of throttle valve 46 is modified to cause pump 35 to operate at a greater volume, a greater combustion level will be developed in combustion chamber 12 thereby increasing the area of the opening of exhaust outlet 16, because valve 18 will be axially further extended against the force of spring 28. It can be seen, as well, for each throttle setting a steady state operation at a given combustion pressure is maintained with the proper amount of back pressure being developed to yield the desired combustion. The valve 18 then serves to hold the pressure in chamber 12 at a most efficient level for each particular throttle setting thereby assuring maximum economy of operation. With valve 18 maintaining a constant pressure in the chamber 12, as discussed above, maximum use of heat for conversion into thrust is insured by creating a cool exhaust with the constant pressure drop of gasses forced out of outlet 16.

The description of a preferred embodiment constructed according to the principles of this invention is only exemplary, and it is contemplated that those skilled in the art may make modifications to the elements thereof or their structural arrangement within the scope of the appended claims.

What is claimed is:

1. A jet engine comprising a combustion chamber having an inlet means for receiving a fuel-air mixture and an outlet means forming an orifice for expelling to the atmosphere exhaust gasses generated by combustion in said chamber; first valve means operable in response to pressure generated by combustion in said chamber for opening and closing said orifice, said valve means being operable to increase the area of opening of said orifice with increasing combustion; mixing means adapted to receive fuel from a fuel source for mixing said fuel with air to form a combustible fuel-air mixture; pump means communicating with said mixing means and said inlet means to pump said fuel-air mixture into said combustion chamber; motor means driven by said exhaust gasses from said combustion chamber for driving said pump means; duct means communicating a portion of said exhaust gasses from said combustion chamber to said motor means and throttle means interposed in said duct means for controlling the quantity of flow of said exhaust gasses therethrough.

2. The jet engine defined in claim 1 having in addition a means for starting said motor means prior to the commencement of combustion in said combustion chamber and a second valve means for closing said duct means when said means for starting is being operated, said second valve means being adapted to open when a predetermined combustion pressure is developed in said combustion chamber.

3. The jet engine defined in claim 1 wherein said combustion chamber is a hollow cylinder with said outlet means being formed in one end thereof.

4. The jet engine defined in claim 3 wherein said first valve means comprises a valve head shaped to close said outlet means, a valve stem extending from said valve head the axial length of said cylindrical combustion chamber and through another end, otherwise closed, of said cylindrical chamber and a spring means attached to said valve stem and said other end of said cylindrical combustion chamber biasing said valve head into a position closing said outlet means, said spring means having a predetermined constant such that said valve stem and said valve head will be extended a predetermined distance opening said outlet means to a predetermined area of opening by a predetermined combustion-produced pressure in said combustion chamber.

5. The jet engine defined in claim 1 wherein said motor means is a turbine operated by a portion of said exhaust gasses from said combustion chamber.

References Cited
UNITED STATES PATENTS

| | | | |
|---|---|---|---|
| 2,512,254 | 6/1950 | Mallory | 60—247 |
| 2,814,929 | 12/1957 | Morley | 60—39.14 |
| 3,112,613 | 12/1963 | Nelson | 60—247 |
| 3,475,907 | 11/1969 | Kellett | 60—39.74 |

DOUGLAS HART, Primary Examiner

U.S. Cl. X.R.

60—39.14, 39.15, 269